(12) United States Patent
Kaznacheev et al.

(10) Patent No.: US 6,896,862 B2
(45) Date of Patent: May 24, 2005

(54) METHOD FOR REDUCING THE SURFACE OF SILICON DIOXIDE

(75) Inventors: Vlail Petrovic Kaznacheev, Novosibirsk (RU); Aleksander Trofimov, Novosibirsk (RU); Eugen Bren, Mariapfarr (AT); Michael Ehrenberger, Mogersdorf (AT); Stefan Ritzer, Tamsweg (AT); Peter Kössler, Mariapfarr (AT); Norbert Fuchs, Mariapfarr (AT)

(73) Assignee: Ökopharm Forschungs- und Entwicklungs-GmbH, Unternberg (AT)

( * ) Notice: Subject to any disclaimer, the term of this patent is extended or adjusted under 35 U.S.C. 154(b) by 0 days.

(21) Appl. No.: 10/290,592

(22) Filed: Nov. 8, 2002

(65) Prior Publication Data

US 2003/0129116 A1 Jul. 10, 2003

Related U.S. Application Data

(63) Continuation of application No. PCT/AT01/00135, filed on May 9, 2001.

(30) Foreign Application Priority Data

May 10, 2000 (AT) ......................................... A 818/2000

(51) Int. Cl.[7] ............................ C09C 1/30; C01B 33/18
(52) U.S. Cl. ..................................... 423/335; 174/35 R
(58) Field of Search ........................ 423/335; 174/35 R

(56) References Cited

U.S. PATENT DOCUMENTS 5,424,810 A * 6/1995 Tomiyama et al. ...... 430/106.2

6,607,648 B1 * 8/2003 Franceschetti et al. ...... 204/557

FOREIGN PATENT DOCUMENTS

| DE | 248348 | 8/1987 |
| RU | 2012175 | 4/1994 |
| RU | 2122446 | 11/1997 |
| WO | WO 00/28113 | 5/2000 |

OTHER PUBLICATIONS

Carlisle, "Silicon as a trace nutrient," *The Science of the Total Environment*, 73:93–106, 1988, no month.

Carlisle, "Silicon as an essential trace element in animal nutrition," *Silicon Biochemistry*, Wiley, Chichester, Ciba Foundation Symosium 121:123–139, 1986, no month.

Mancinella, "II silicio, un olioelemento essenziale per gli organismi viventi," *La Clinica Terapeutica*, 137:343–350, 1991, no month.

Pfannhauser, "Wann heiBt ein Spurenelement essentiell?" In: *Essentielle Spurenelemente in der Nahrung*, Springer–Verlag, Berlin, Chapter 2, pp. 5–10, article in German, 1988, no month.

Schwarz et al., "Inverse relation of silicon in drinking water and atherosclerosis in Finland," *The Lancet*, 538–539, 1977, no month.

* cited by examiner

*Primary Examiner*—Ngoc-Yen Nguyen
(74) *Attorney, Agent, or Firm*—Fulbright & Jaworski LLP

(57) ABSTRACT

There is described a method for reducing the surface area of silicon dioxide, which is characterized in that silicon dioxide is introduced into an electromagnetic shielding device selected from an aluminum/magnesium metal shielding device and a hypomagnetic chamber of Permalloy steel, and is incubated for a period of at least 3 hours, preferably at least 6 hours.

8 Claims, 7 Drawing Sheets

METHOD FOR REDUCING THE SURFACE OF SILICON DIOXIDE

Figure 1:
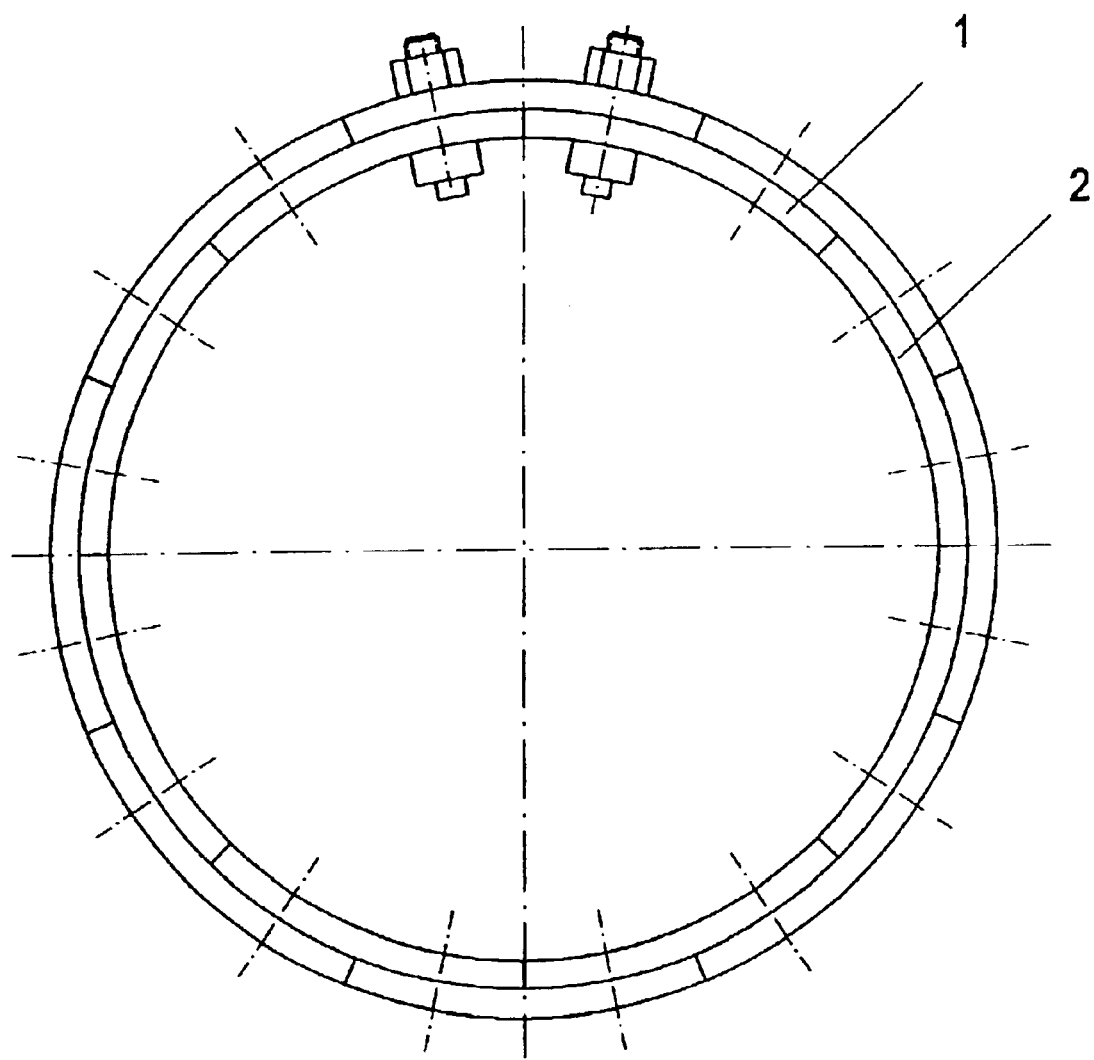
Figure 2:
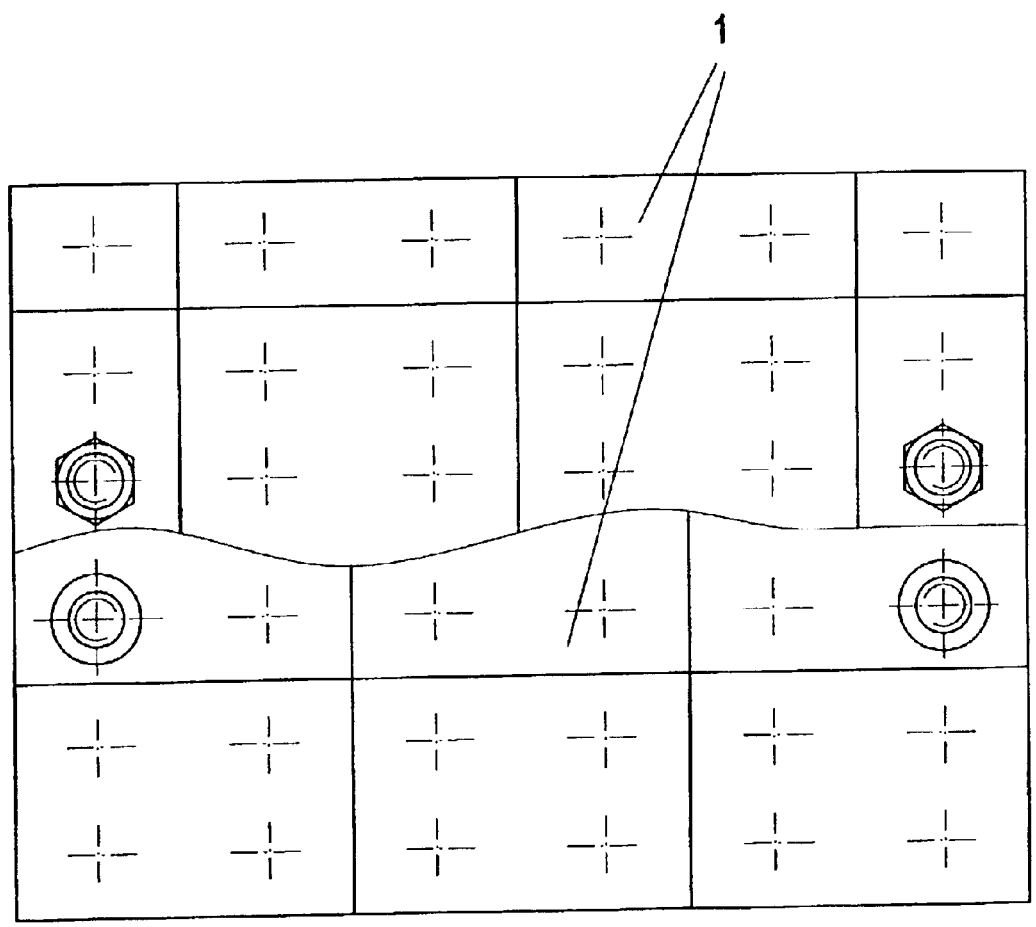
Figure 3:
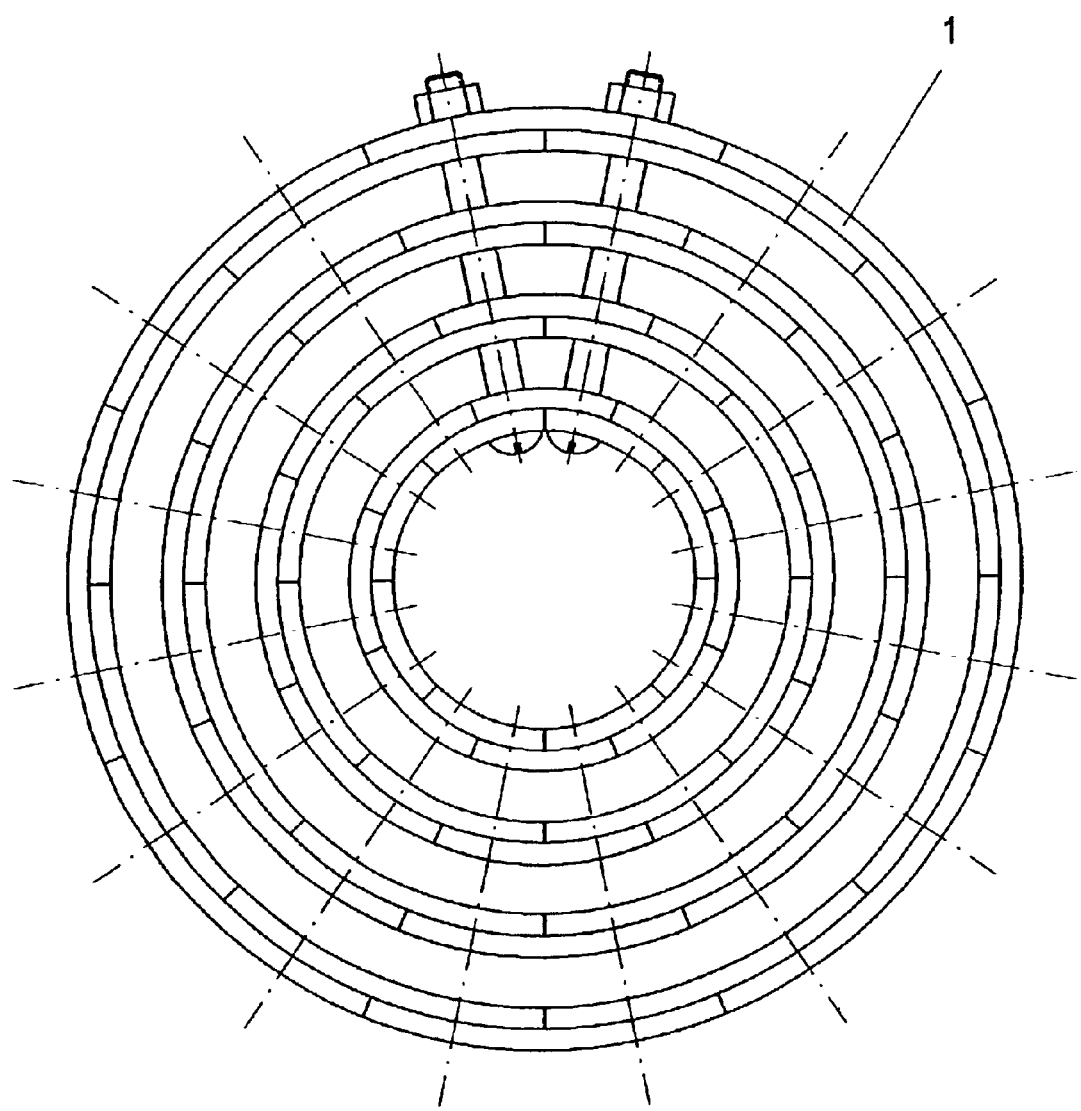
Figure 4:
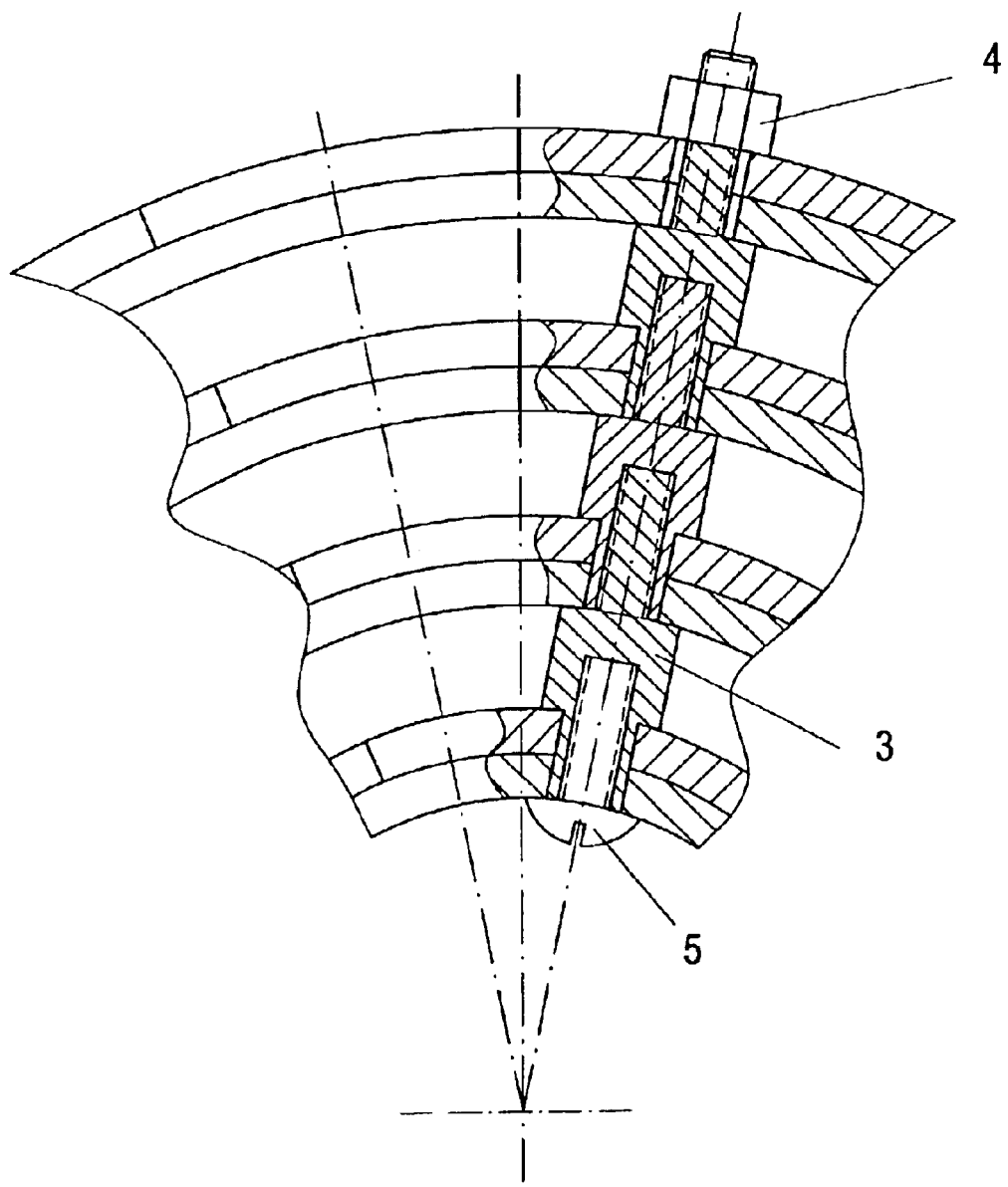

This application is a continuation of PCT Application No. PCT/AT01/00135 filed 9 May 2001, which claims priority to Austrian Application No. A 818/2000 filed 10 May 2000, the contents of which are incorporated herein by reference in their entirety.

The invention relates to a method for reducing the surface area of silicon dioxide.

Silicon dioxide (silicic acid, silica, silicea, silicium dioxidatum) in drug and food technology serves as an inorganic hydrogen former, as an adjuvant in the production of tablets and capsules, as a lubricant, as an adsorbent, as a separating agent, as a flowability-preserving agent and as an active ingredient carrier, but is also contained in its natural form in various medicinal herbs and foodstuffs.

Although silicon and its compounds have not been recognized as essential nutrients by official nutrition authorities, the essentiality of silicon and its compounds to the human organism has been discussed and affirmed in scientific publications already for decades (cf. W. Pfannhauser, Essentielle Spurenelemente in der Nahrung, Springer (1988), pages 5–10; A. Mancinella, Il. silicio, un oligoelemento essenziale per gli organismi viventi, Clin. Ter. 137:343–350 (1991); K. Schwarz, B. A. Ricci, et al: Inverse relation of silicon in drinking water and atherosclerosis in Finland, The Lancet (1977), 538–539; E. M. Carlisle, Silicon as an essential trace element in animal nutrition (1986), Silicon Biochemistry, Wiley, Chichester (Ciba Foundation Symposium 121), 123–139; E. M. Carlisle, Silicon as a trace nutrient, The Science of the Total Environment, 73 (1988), 95–106).

The above-mentioned publications describe the essentiality of silicon as a structural component of the connective tissue, but also as being substantial in regard to the functions of the heart/circulation system, immune system, bone metabolism, ageing processes and as an aluminum antagonist (in the context of morbus Alzheimer).

In addition to said biochemical properties, silicon and its compounds are supposed to exhibit also elementary biophysical functions in organic organisms (plants, animals, man). Due to its position in the periodic system of elements (fourth period), the function of a semiconductor is attached to the element silicon, for which reason it is widely used in application technology (semiconductor physics, laser and computer technologies). Accordingly, silicon in organic living beings also is supposed to play a role in the intracellular and intercellular transfer of signals and exhibit an elementary function in storage and transformation.

The selective and controlled modification of the biophysical properties of highly disperse silicon dioxide, in particular in terms of surface structure or adsorption qualitites in respect to the substances to be adsorbed, has so far been achieved in the prior art only by applying mechanical influences. Such mechanical influences are, however, frequently difficult to control, exhibiting a large variance in terms both of local preciseness and reproducibility.

It is, therefore, the object of the present invention to modify the supermolecular structure of silicon dioxide and related silicon/oxygen compounds without exerting any mechanical influence.

In accordance with the invention, this object is achieved by a method for reducing the surface area of silicon dioxide, which method is characterized in that silicon dioxide is introduced into an electromagnetic shielding device selected from an aluminum/magnesium metal shielding device and a hypomagnetic chamber of Permalloy steel, and is incubated for a period of at least 3 hours, preferably at least 6 hours.

Surprisingly, the biophysical properties of a silicon structure could be modified by incubation in an electromagnetic shielding device according to the invention to the effect that the mean surface area of the silicon dioxide preparation, measured in a BET test (isothermal analysis by nitrogen adsorption at $-77°$ K, measured by ASAP-2400 of Micromeritics/U.S.A.), was reduced. The electromagnetic shielding device in the first place is to be suitable—similar to a Faraday cage—to shield magnetic influences and enable structural changes in the biophysical properties of silicon dioxide on account of such shielding. By the treatment according to the invention it is feasible to selectively modify, for instance, the adsorption capacity or adsorption selectivity of silicon dioxide. This was completely suprising also because of the fact that the treatment according to the invention was carried out without any mechanical influence, while nevertheless enabling structural modifications.

The aluminum/magnesium metal shielding device according to the invention is comprised of an aluminum/magnesium alloy preferably further containing silicon. Preferred metal shields contain 80–98%, preferably 90–95%, aluminum, 2–20%, preferably 3–7%, magnesium and 0–2%, preferably 1–1.5% silicon. It has, furthermore, been shown according to the invention that the effects of the invention cannot be achieved by means of a metal shielding device made of pure aluminum.

The hypomagnetic chamber according to the invention likewise must be comprised of a special material which ensures the effects according to the invention to occur, that is to say of Permalloy steel or a Permalloy alloy. By Permalloy alloys or steels, Fe—Ni-based magnetic materials containing 72–83% Ni portions and preferably Mo, Cu and Cr as additives are generally understood. The materials according to the invention have comparatively high permeability values ranging between 30,000 and 150,000, a low magnetic power loss during magnetic reversal, and rectangular hysteresis loops (cf. Lueger, Lexikon der Technik, Vol. 16, "Magnetische Werkstoffe; in particular, point 5.1.2.2.). According to the invention, the final magnetic field through the chamber is attenuated to preferably $\frac{1}{600}$, in particular $\frac{1}{5000}$, attenuation being a function also of the chamber size.

Preferred structural variants of this electromagnetic shielding device are described, for instance, in RU patents Nos. 2012175 and 2122446.

Particularly suitable devices used to realize the shielding according to the invention are described in the Examples below. The time of incubation according to the invention, during which the silicon dioxide will remain in the electromagnetic shielding device according to the invention is not critical, as a rule. Yet, the effect according to the invention will be the stronger the longer the incubation time. To be sure, this direct dependence of the effect according to the invention, on the time of incubation also is a function of the efficacy of the electromagnetic shielding, but will reach a plateau at approximately 72 hours (for instance, in the devices according to the invention). Preferably, the incubation according to the invention is, therefore, carried out over a period of 12 to 200 hours, preferably during 24 to 100 hours, whereby a period of approximately 72 hours has proved to be the procedural optimum to provide the optimum electromagnetic shielding system.

Since a silicon dioxide whose biophysical property has been modified without any mechanical influence has so far been neither described nor rendered obvious, the present invention also relates to a silicon dioxide whose surface properties have been biophysically modified in respect to the starting preparation without applying any mechanical influence. In particular, the present invention relates to a silicon dioxide that is obtainable by the method according to the invention.

The invention will be explained in more detail by way of the following examples, to which it is, however, not limited, and the accompanying drawings, wherein:

FIGS. 1 to 4 illustrate a hypomagnetic chamber, and
FIGS. 5 to 8 depict a metal shield according to the invention.

EXAMPLES

A) Devices

Device 1 (Hypomagnetic Chamber):

This device of Permalloy steel serves to shield semiconductor elements such as silicon and its compounds against magnetic influences in a biophysical experiment and during biophysical applications. The chamber provided for this purpose is comprised of four bowls of ferromagnetic material (1, 2) including spacers (3) and fastening means (5, 4), and serves to shield the encased space against magnetic influences from the environment. External diameter 2 m, internal diameter 1.2 m, length 3.8 m.

A test specimen of the chamber having an internal diameter of 1200 mm, an external diameter of 2000 mm and a length of 3900 mm was made of a strip 79 nm, thickness 1.5 mm, width 250 mm.

Figure 5:
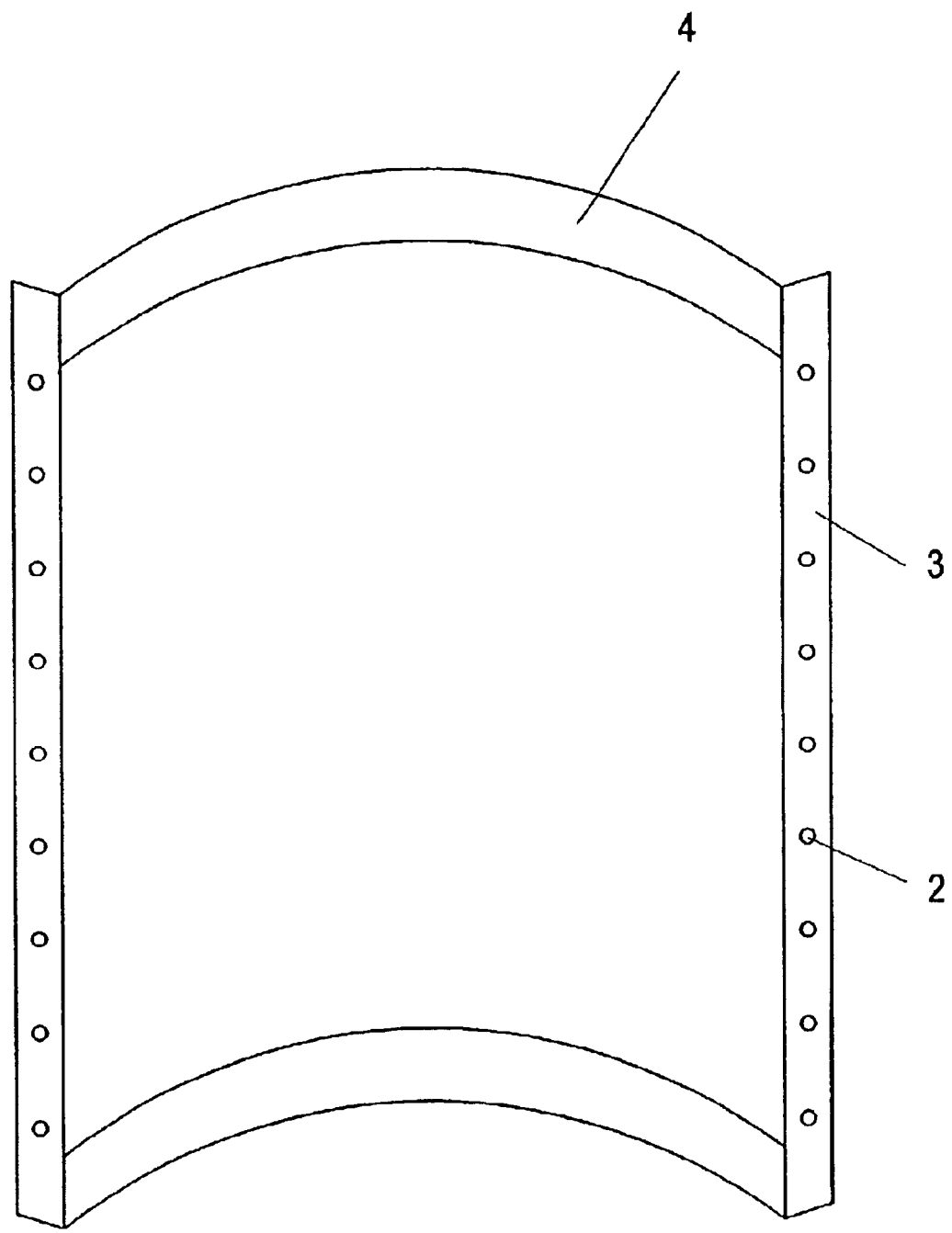
Figure 6:
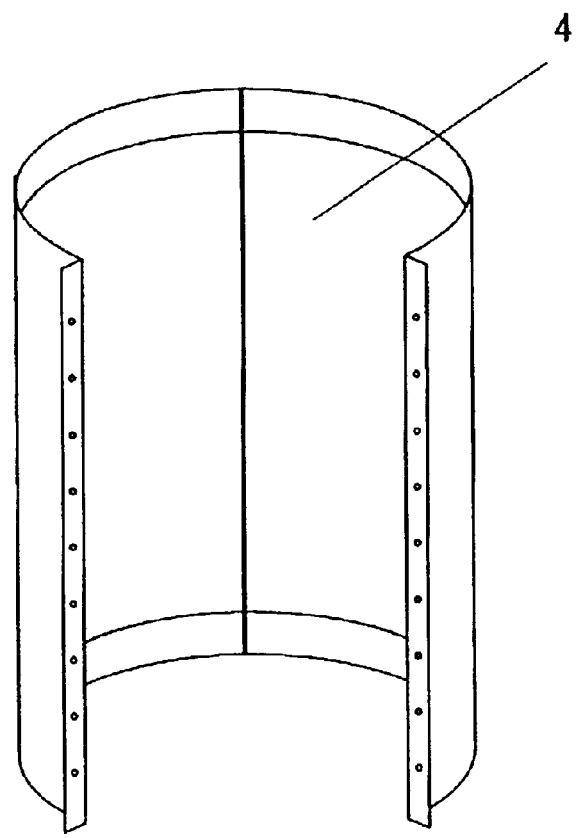
Figure 7:
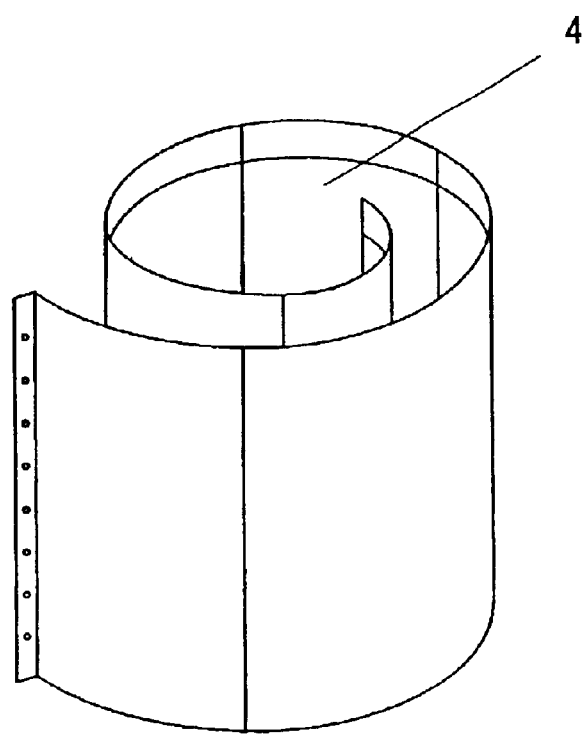
Figure 8:
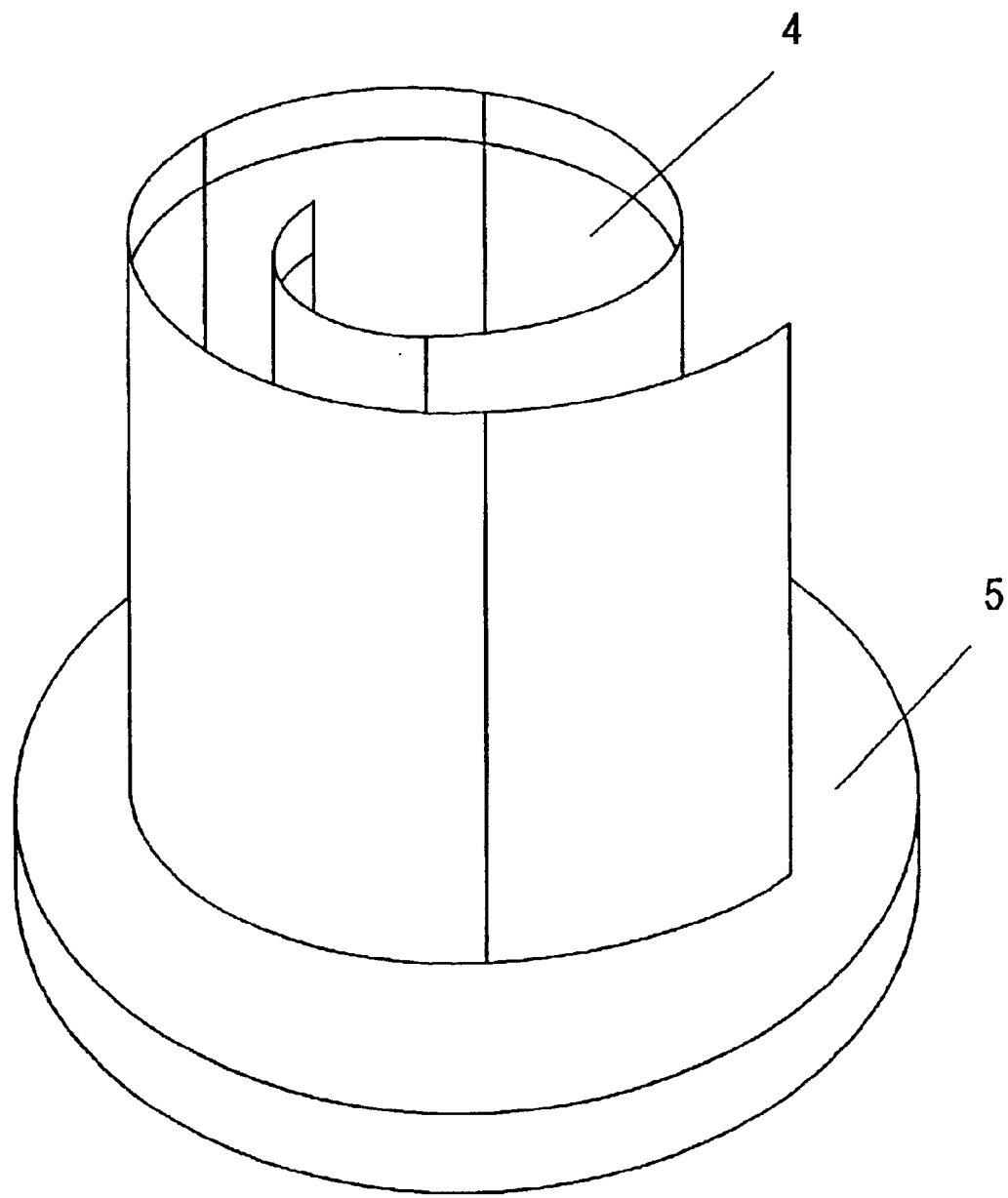

Device 2 (Metal Shield):

This metal shield is comprised of a metal plate structure made of an aluminum alloy (93.2% Al, 5.4% Mg, 1.4% Si), thickness 1.5 mm, height up to 280 cm, width 129 cm, having a ground surface and a curvature that ensures the distance of the focus from the working surface to be 50 cm (FIG. 5). The plates are interconnected so as to form a spiral-shaped surface. Each of the structural elements is connected with the other structural elements by butt joints and fastened by means of 15 fastening screws (2) and metallic angular mounting plates (3) having the dimensions 5.0×5.0×280 cm, which are riveted from two sides to the working surface of each element. An aluminum ring (4) having the same curvature as the working surface and the dimensions 120.0×15.0 cm renders the structure more rigid both in the upper and lower parts of each element. The elements may be interconnected and fastened by butt joints, thus forming a cylinder (of 4 or 6 elements) (FIG. 6) that is open in its entry region, yet also a left-handed or right-handed spiral-shaped structure comprising 8 to 10 elements (FIGS. 7, 8) and defining a working volume in the form of a nonclosed cylinder including a bottom element (6) is conceivable.

B) Influence of device 1 (hypomagnetic chamber) and of device 2 (metal shield) on the surface of two modifications of highly disperse silicon dioxide, i.e., Aerosil 200 and Aerosil 380, respectively:

Two highly disperse silicic acid preparations (having the trade names Aerosil 200 (mean surface according to BET= 200 m$^2$.g$^{-1}$) and Aerosil 380 (mean surface according to BET=200 m$^2$.g$^{-1}$)) are introduced for 72 hours into the hypomagnetic chamber and metal shield, respectively. An appropriate comparative sample of the same batch is stored under normal conditions outside the two devices. After this, the samples to be measured as well as the comparative sample are degassed (or dried) at 50° C. for 20 hours under high vacuum and their surfaces are determined by means of the BET method. In doing so, the individual samples are consecutively numbered as follows:

Sample No. 1=Aerosil 200 control sample
Sample No. 2=Aerosil 200 after hypomagnetic chamber
Sample No. 3=Aerosil 200 after metal shield
Sample No. 4=Aerosil 380 control sample
Sample No. 5=Aerosil 380 after hypomagnetic chamber
Sample No. 6=Aerosil 380 after metal shield The determinations of the silicon dioxide surfaces according to BET (each carried out three times) are summarized in the following Table (as well as in the annexed individual results):

| Sample No. | Original weight of sample (g) | Weight (after degassing at 50° C.) | % Loss in mass | BET (m$^2$/g) (based on the sample weighed in) | BET (m$^2$/g) (based on degassed sample) |
|---|---|---|---|---|---|
| 1 | 0.1210 | 0.1024 | 15.4 | 197 | 233 |
| 2 | 0.1638 | 0.1452 | 11.4 | 198 | 223 |
| 3 | 0.2781 | 0.2658 | 4.4 | 199 | 208 |
| 4 | 0.1923 | 0.1671 | 13.1 | 335 | 386 |
| 4-2 | 0.1828 | 0.1588 | 13.1 | 329 | 379 |
| 5 | 0.3048 | 0.2804 | 8.0 | 315 | 342 |
| 6 | 0.1902 | 0.1713 | 9.9 | 302 | 335 |

The measured results (of sample no. 1 to sample no. 3 and sample no 4 to sample no. 6) demonstrate the reduction of the surface areas of the silicon dioxide samples employed, after introduction of the same into the hypomagnetic chamber and metal shield, respectively. The investigation results, in addition, show a stronger decrease of the surface areas after introduction into the metal shield compared to those samples introduced into the hypomagnetic chamber.

The measured results indicate that it is possible to modify the surfaces of silicon compounds without mechanical influences, an effect apparently induced by a change in the supermolecular bonds of individual silicon dioxide molecules due to changes in the electromagnetic environment. It is, thus, feasible by changing the supermolecular structures (measurable by surface changes according to the BET method) of silicon compounds of inorganic and organic (vegetable and fossile) origin and other semiconductor elements, to modify and standardize the biophysical properties of the thus changed substances.

What is claimed is:

1. A method for reducing the BET surface area of silicon dioxide as measured after degasing of the silicon dioxide, comprising:
   introducing silicon dioxide having an initial BET surface area into an electromagnetic shielding device; and
   incubating the silicon dioxide for a period of at least 3 hours to produce silicon dioxide having a reduced BET surface area that is less than the initial BET surface area.

2. The method of claim 1, wherein the electromagnetic shielding device is an aluminum/magnesium metal shielding device or a hypomagnetic chamber of Permalloy steel.

3. The method of claim 2, wherein the electromagnetic shielding device is an aluminum/magnesium metal shielding device.

4. The method of claim 2, wherein the electromagnetic shielding device is a hypomagnetic chamber of Permalloy steel.

5. The method of claim 1, wherein the silicon dioxide is incubated for a period of at least 6 hours.

6. The method of claim 5, wherein the silicon dioxide is incubated for a period of 12 to 200 hours.

7. The method of claim 6, wherein the silicon dioxide is incubated for a period of 24 to 100 hours.

8. The method of claim 7, wherein the silicon dioxide is incubated for a period of approximately 72 hours.

* * * * *